United States Patent Office 2,782,119
Patented Feb. 19, 1957

2,782,119

PROCESS OF PRODUCING SILVERY IRON

Edwin A. Jones, Jackson, Ohio, assignor, by mesne assignments, to Interlake Iron Corporation, Cleveland, Ohio, a corporation of New York No Drawing. Application May 21, 1953,
Serial No. 356,590

2 Claims. (Cl. 75—129)

Silvery iron is a ferro-silicon and can be produced in either a blast furnace or electric furnace. It is cast into convenient sized pigs with silicon content usually specified as ranging from 5 to 17 percent, and manganese from 0.25 to 3.00 percent. The iron is shipped normally with a variation of less than 0.50 percent, plus or minus, from the specified silicon and manganese contents. Silvery iron is used by every branch of the iron and steel industry, namely, steel, gray cast iron, malleable iron and special irons such as heat resisting, acid resisting, etc. In silicon content, silvery iron is distinguished from basic pig iron which contains about 1% silicon; bessemer pig iron which contains from 1% to 2% silicon; and foundry pig iron which contains from 1.25% to 2.75% silicon.

This invention relates to the metallurgy of silvery iron, and comprehends a novel process and the product resulting therefrom.

The invention has numerous advantages over the practices of the prior art in producing silvery iron. Silvery pig iron has two major components, iron and silicon, and the final cost of production is dependent upon how efficiently each of these components can be produced and combined in an end product. The blast furnace is essentially an iron smelting unit, and is most efficient when used for the production of a product that is essentially iron. When substantial quantities of silicon need to be incorporated in the iron, and when such silicon needs to be produced in the blast furnace simultaneously with the iron, the efficiency of the blast furnace drops off because it is not an efficient unit for the reduction of silicon. The electric furnace, in comparison with the blast furnace, is not, at prevailing rates for power, an efficient iron reduction unit, and when used for this purpose, it cannot compete with a blast furnace in reducing iron from its ore. However, the electric furnace is efficient in the reduction of silicon from its ore, and is far superior to the blast furnace in this respect. Hence, if the electric furnace is used to produce a silvery iron of high iron content, its commercial inefficiency in reducing iron from ore leads to utilizing iron introduced into the furnace as steel scrap. This is disadvantageous because frequently the steel scrap costs more than the cost of producing an equivalent amount of iron in a blast furnace, and additionally there is only a very limited control of the quality of the end product due to contaminations from impurities originally in the steel scrap. The present invention obviates the disadvantages of reducing a large amount of silicon in the blast furnace, or of reducing a large amount of iron in the electric furnace, by the novel steps of reducing a larger proportion of the iron in the blast furnace and a larger proportion of silicon in the electric furnace, and combining the products of the two furnaces to produce an end high quality product of silvery iron at a lower cost than could be achieved in an electric furnace or blast furnace alone.

One of the objects of the invention is a process for producing silvery iron by smelting in a blast furnace a burden to produce a pig iron relatively low in silicon content, separately smelting in an electric furnace a charge to produce ferro-silicon containing a silicon content greater than required for silvery iron, and combining the products of the separate furnaces in a ladle or outside mixing hearth to produce a silvery iron containing the required amount of silicon.

Another object of the invention is to produce silvery iron having a desired silicon content in a separate vessel from the combined separately reduced products of a blast furnace and an electric furnace.

A further object of the invention includes a process for producing silvery iron by smelting a burden in a blast furnace under reducing conditions at normal blast furnace temperatures to produce pig metal having a silicon content greater than occurs in basic pig iron, or bessemer pig iron, or foundry pig iron, but less than required for silvery iron, smelting a separate charge in an electric furnace under reducing conditions at temperatures normally higher than blast furnace temperatures to produce ferrosilicon having a silicon content between 25% to 55%, and then combining the blast furnace product with the electric furnace product in a molten state in an outside mixing hearth or ladle in proportions to uniformly mix the products to produce silvery pig iron at a proper casting temperature.

Another object of the invention is to produce silvery iron by a process which includes reducing the bulk of the required iron from iron ore in a blast furnace, reducing the bulk of the required silicon from siliceous materials from a separate charge in the presence of iron to form ferro-silicon in an electric furnace, and combining the products in molten state to produce silvery iron above 6% and below 20% contained silicon.

Another object of the invention is a process comprising the steps of blending a blast furnace silicon-iron in molten state with an electric furnace ferr-silicon in molten state, and regulating the blending by varying the pouring rate of the ferro-silicon in accordance with the temperatures of the molten constituents.

Other objects of the invention will be apparent from the description herein and the appended claims.

In accordance with the invention, a blast furnace is burdened with iron ore, limestone, and fuel in the form of coal and coke, and operated to produce a pig iron too low in silicon for the desired grades of silvery iron. An electric furnace is charged with siliceous material, scrap iron and reducing carbon in the form of coal and coke, and operated with a submerged arc to produce a ferroalloy product relatively high in silicon. The blast furnace iron is poured into a mixing hearth and the ferro-silicon is folded or blended with the blast furnace iron in such proportions as to form a silvery iron containing from 6% to 20% silicon. In the preferred form of the invention, the blast furnace iron contains from 4% to 9% silicon, and the electric furnace ferro-silicon contains from 25% to 55% silicon, and the end product silvery iron contains 8% to 16% silicon.

The products of both furnaces are combined in a mixing hearth or ladle outside both furnaces under controlled conditions. Usually the proportions of blast furnace iron will run from 5 to 9 parts by weight to 1 part of electric furnace iron, and the method of mixing must be modified to take care of the differences in the temperatures of the two different metals. The blast furnace iron will usually have a tapping temperature between 2500° F. and 2700° F., while the electric furnace ferro-silicon will usually have a tapping temperature of from 2800° F. to 3000° F.

The invention is preferably carried out by smelting in a wholly fuel-fired blast furnace a burden which produces an iron upon tapping that has a silicon content between 4% and 9% and a temperature approximating 2650° F.

to 2900° F.; smelting in an electric furnace of the submerged arc type a burden which produces a ferro-silicon which upon tapping that has a silicon content of about 25 to 55%, and a temperature approximating 2900° F. to 3200° F.; and folding the same together in the molten state in proper proportions in a hearth to produce a silvery iron containing 8% to 16% silicon. At the temperatures aforesaid, the blending of the silvery iron containing silicon in ranges mentioned above, is accomplished in the mixing hearth without difficulty. As the silicon content of the blast furnace product and the electric furnace product is varied to meet production requirements, changes of each product occur. As the silicon content is increased in the electric furnace, the temperature is increased somewhat. This is usually overcome by a waiting period to allow temperature drop, the hotter and higher silicon product from the electric furnace cooling faster, and thus reducing the temperature differences.

Close attention is given to the blending process to secure a uniform end product. Where the temperature differences are extreme, the mixing is regulated in a way to give the best results, namely, by pouring the electric furnace iron more slowly and folding it into the actual stream of the blast furnace iron as it enters the ladle. However, in the broader aspects of the invention, any satisfactory mixing or blending method may be used.

An illustrative example of the invention is herewith given:

1. Blast furnace burden charge

| Iron Ores | Pounds | Average Analyses of Ores | | |
|---|---|---|---|---|
| | | Iron | Silica | Manganese |
| Cornell | 2,500 | 36.5 | 44.0 | .10 |
| Hamilton | 5,700 | 52.0 | 8.0 | .60 |
| Williamson | 5,700 | 51.0 | 10.0 | .50 |
| Brunswick | 5,700 | 52.0 | 6.5 | 1.30 |
| Maroco | 2,200 | 30.0 | 25.0 | 9.0 |
| Limestone | 5,600 | | | |
| Coal | 2,200 | | | |
| Coke | 10,000 | | | |
| Furnace Scrap | 600 | | | |

56 rounds of a burden similar to the above produced an aggregate weight of pig iron of 647,300 lbs., divided into six tappings as follows:

| | Silicon | Manganese | Sulphur |
|---|---|---|---|
| 112,500 lbs | 5.80 | 2.30 | .034 |
| 112,200 lbs | 6.37 | 2.16 | .030 |
| 105,900 lbs | 5.70 | 2.20 | .033 |
| 109,300 lbs | 6.03 | 2.25 | .030 |
| 114,200 lbs | 6.04 | 2.15 | .030 |
| 93,200 lbs | 6.45 | 2.18 | .034 |

The slag, which is tapped off prior to tapping the furnace for metal, analyzes as follows:

| | |
|---|---|
| $SiO_2$ | 41.40 |
| $Al_2O_3$ | 13.00 |
| CaO | } 42.46 |
| MgO | |
| MnO | 1.66 |
| Sulphur | 1.48 |

Ratio of bases to acids 1:00/1.

2. Electric furnace burden

| | Lbs. |
|---|---|
| Gravel (quartzite) | 350 |
| Breeze | 60 |
| Coal | 85 |
| Nut coke | 30 |
| Chips | 25 |
| Scrap | 385 |

182 rounds of this mix in a 24 hour period were smelted with a submerged arc to produce a total of 91,200 lbs. of ferro-silicon tapped out as follows:

| | |
|---|---|
| 16,400 lbs | ⎫ |
| 17,100 lbs | ⎪ |
| 17,000 lbs | ⎬ 30.30% silicon |
| 16,000 lbs | ⎭ |
| 15,000 lbs | ⎫ 30.08% silicon |
| 9,700 lbs | ⎭ |

The average silicon content of the ferro-silicon was 30.20%.

3. The folding or blending of the products 112,500 lbs. of blast furnace molten iron containing 5.80% silicon was blended in a mixing hearth together with 16,400 lbs. of electric furnace molten ferro-silicon containing 30.30 silicon. The product analyzed 8.27% silicon, .029% sulphur, .117% phosphorus, and 1.89% manganese. Similarly, the following were folded or blended to produce like products.

| Blast Fce., Iron | | Elec. Fce., FeSi | | Silvery Iron Produced | | | |
|---|---|---|---|---|---|---|---|
| lbs. | Percent Si | lbs. | Percent Si | lbs. | Percent Si | Percent S | Percent Mn |
| 112,200 | 6.37 | 17,100 | 30.30 | 129,300 | 8.76 | .023 | 2.04 |
| 105,900 | 5.70 | 17,000 | 30.30 | 122,900 | 8.90 | .027 | 1.91 |
| 109,300 | 6.03 | 16,000 | 30.30 | 125,300 | 8.17 | .024 | 1.93 |
| 114,200 | 6.04 | 15,000 | 30.08 | 129,200 | 8.56 | .024 | 1.97 |
| 93,200 | 6.45 | 9,700 | 30.08 | 102,900 | 8.10 | .030 | 1.89 |

The total silvery iron produced above over a 24 hour period was 738,500 lbs. with an average analysis of 8.46% silicon, 1.94 manganese, and the balance iron, except for fortuitous impurities.

It will be observed in the above example that a blast furnace iron has been produced which has a silicon content lower than required in the end product and consistent with adequate blending with the electric furnace ferro-silicon. In this way, better and easier blending is achieved without substantial graphite separation; additionally, the electric furnace ferro-silicon product need not be so high in silicon content to mix with the blast furnace iron to produce the silvery iron, and this feature lends itself to good mixing and a better and more uniform silvery iron end product. Furthermore, the electric furnace need not be operated at as high a temperature as when higher silicon ferro-silicon is produced, with the advantages of saving in power and closer equalization of tapping temperature to the tapping temperature of the blast furnace iron.

It will be abundantly clear from the above description that the invention utilizes a blast furnace to reduce the major quantity of iron required in the silvery iron product, and utilizes the electric furnace as a smelting or reducing unit (as distinguished from a melting unit) to reduce in the form of ferro-silicon the added quantity of silicon required in the silvery iron product. While the invention is directed to silvery iron, other metals such as manganese, chromium, nickel etc. may be included by ore reduction or ferro-alloy or other metallic addition to the basic iron-silicon product which is produced in accordance within the spirit of the invention herein.

It will be noted from the above example of the invention that a satisfactory manganese content of the ultimate silvery iron product is primarily produced in the blast furnace step from the ore burden. However, the manganese content may be primarily supplied from the electric furnace step if desired, or by final addition to the ladle or mixing hearth.

The term "mixing hearth" in the claims is intended to mean ladle, forehearth, runner, or other apparatus commonly used in the art to mix and blend metallurgical products.

Modifications within the spirit of the invention will be apparent to those skilled in the art, and the scope of the invention is not to be limited except as indicated in the appended claims.

I claim:

1. A process of producing silvery iron which comprises the steps of producing in a blast furnace pig iron containing silicon above foundry pig iron silicon content and within the range of approximately 4% to 17% silicon, said blast furnace pig iron having a silicon percentage less than that to be obtained in the final silvery iron product, producing in an electric furnace ferro-silicon having a silicon percentage higher than that to be obtained in the final silvery iron product and up to approximately 55% silicon, and combining the products of the respective furnaces in a mixing hearth outside of the furnaces in proportions to produce a silvery iron final product containing within the range of approximately 6% to 20% silicon, the said blast furnace silicon-containing pig iron having a tapping temperature between approximately 2500° F. and 2900° F. and the said electric furnace ferro-silicon having a tapping temperature between approximately 2800° F. and 3200° F.

2. The process set forth in claim 1 in which the blast furnace pig iron produced contains from approximately 4% up to approximately 9% silicon, the electric furnace ferro-silicon produced contains from approximately 25% up to approximately 55% silicon, and the silvery iron final product contains within the range of from approximately 8% up to approximately 16% silicon.

References Cited in the file of this patent

UNITED STATES PATENTS

| | | |
|---|---|---|
| 1,727,193 | Baily | Sept. 3, 1929 |
| 1,969,886 | Jones | Aug. 14, 1934 |

FOREIGN PATENTS

| | | |
|---|---|---|
| 434,847 | Great Britain | Sept. 10, 1935 |
| 435,093 | Great Britain | Sept. 10, 1935 |